United States Patent [19]

Coleno et al.

[11] Patent Number: 5,125,229
[45] Date of Patent: Jun. 30, 1992

[54] NOZZLELESS PROPULSION UNIT OF LOW ASPECT RATIO

[75] Inventors: Raymond Coleno, Saint Aubin de Medoc; Serge Naibo, Bordeaux Cauderan; Jacques Raynaud, Savigny Sur Orge; Jean Darmois, Bourg La Reine, all of France

[73] Assignees: Societe Nationale des Poudres et Explosifs; Aerospatiale (Societe Industrielle Aerospatiale), both of Paris, France

[21] Appl. No.: 603,878

[22] Filed: Oct. 23, 1990

Related U.S. Application Data

[63] Continuation-in-part of Ser. No. 348,066, May 5, 1989, abandoned.

[30] Foreign Application Priority Data

May 10, 1988 [FR] France ................... 88 06263

[51] Int. Cl.⁵ .......................... F02K 9/10; F02K 9/28
[52] U.S. Cl. ........................ 60/250; 60/253; 60/270.1
[58] Field of Search .............. 60/245, 250, 253, 270.1, 60/255

[56] References Cited

U.S. PATENT DOCUMENTS 3,535,881 10/1970 Schubert.
3,879,942 4/1975 Poin et al. ................. 60/250

FOREIGN PATENT DOCUMENTS 3407901 9/1985 Fed. Rep. of Germany ........ 60/245
131845 8/1982 Japan ...................... 60/245
142043 7/1985 Japan ...................... 60/245

OTHER PUBLICATIONS

Sutton, G. et al. *Rocket Propulsion Elements*, John Wiley and Sons, NY. 1976. pp. 373-383.
Procinsky, I. M. et al. "Nozzleless Boosters for Integral Rocket Ramjet Systems" AIAA-80-1277. Jul., 1980.

Primary Examiner—Richard A. Bertsch
Assistant Examiner—Timothy S. Thorpe
Attorney, Agent, or Firm—Bucknam and Archer

[57] ABSTRACT

A propulsion unit for the acceleration of a self-propelled vehicle, such as a missile or a rocket, is loaded with a propellant block secured laterally to the body of the propulsion unit by means of a combustion inhibitor and has an aspect ratio of between 2.5 and 6. The propellant block has one axial duct and at least 6 peripheral ducts and, on its upstream face, is equipped with a fitting secured to the body of the propulsion unit. This fitting provides a free space between the upstream face of the propellant block and the bottom of the body of the propulsion unit, the axial duct and the peripheral ducts opening into this free space via orifices made in the fitting. The combustion gases are ejected rearward without being fed through a nozzle. Sonic velocity is achieved downstream of the ducts.

13 Claims, 3 Drawing Sheets

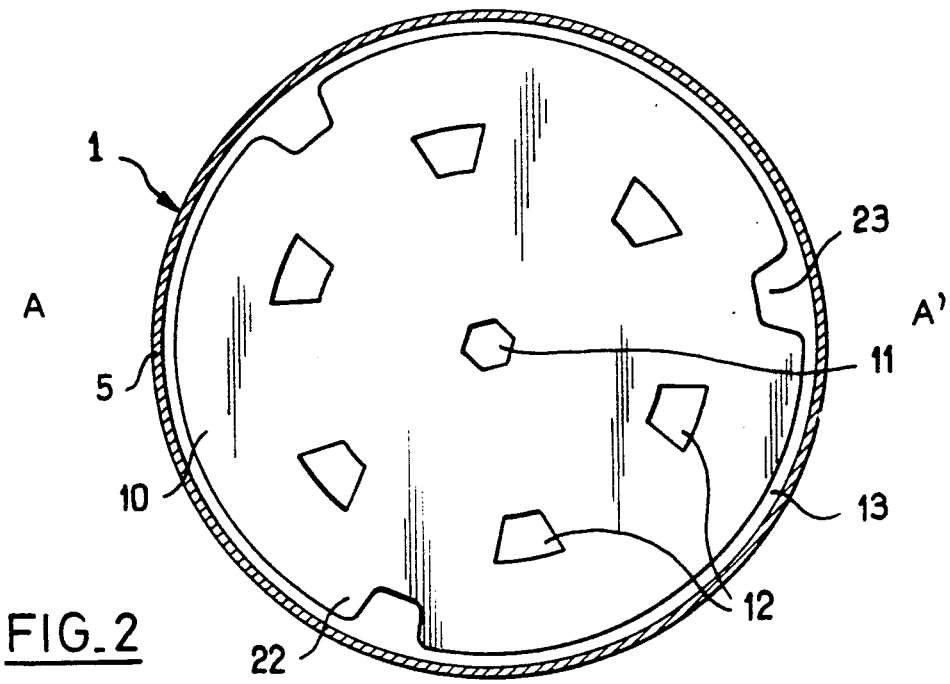
FIG_2
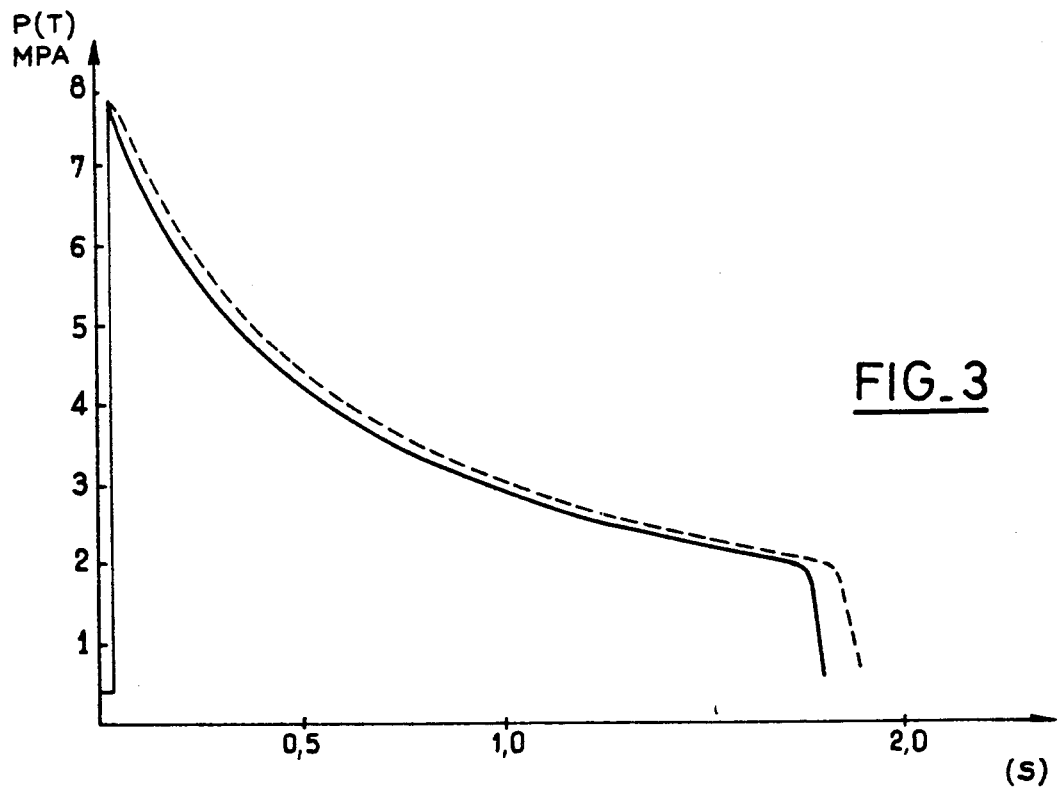
FIG_3

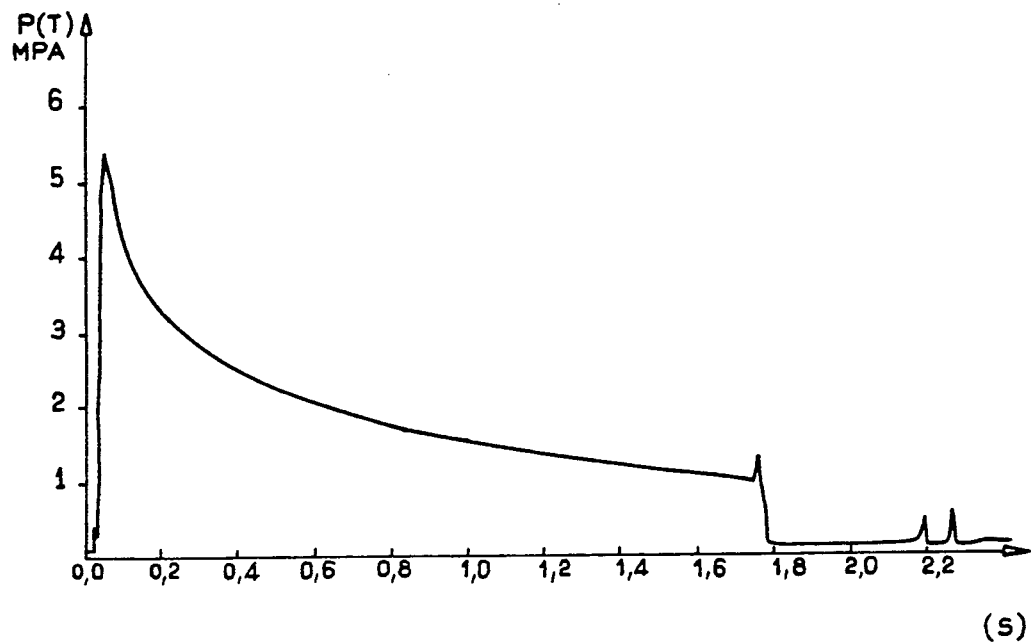
FIG_4
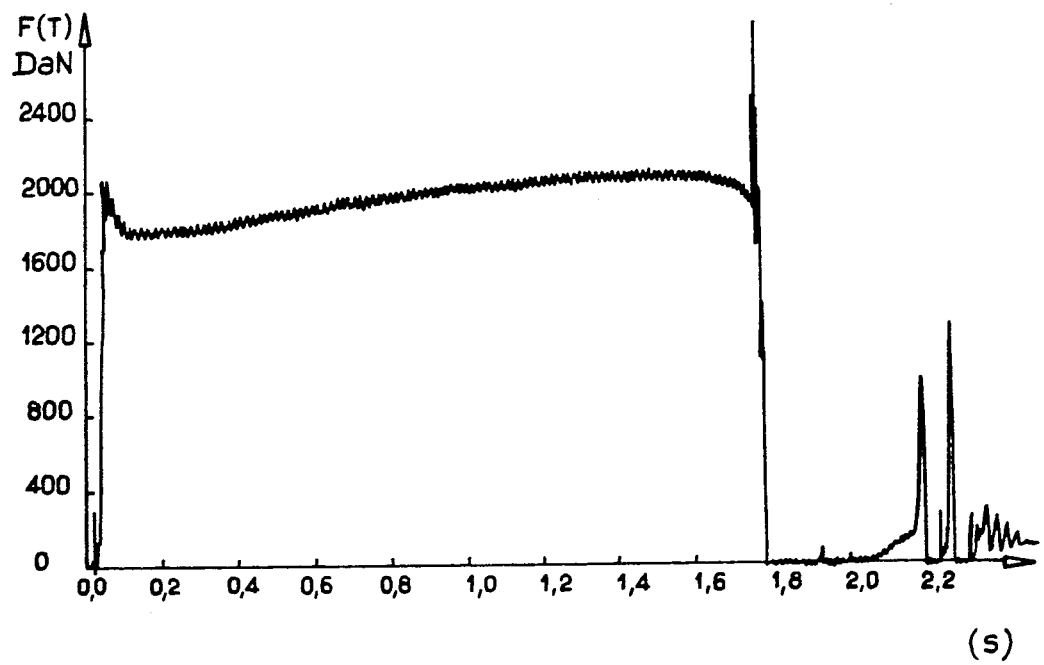
FIG_5

NOZZLELESS PROPULSION UNIT OF LOW ASPECT RATIO

This application is a Continuation-in-Part of U.S. Ser. No. 348,066 filed May 5, 1989, now abandoned.

The invention relates to a propulsion unit for the acceleration of a self-propelled vehicle, such as a missile or a rocket, loaded with a propellant block having several ducts, the combustion gases being ejected rearward from each duct without being fed through a nozzle.

A propulsion unit, where the gases are directly ejected rearward without being fed through a nozzle, is a nozzleless propulsion unit. In this unit, the acceleration of the combustion gases is the result of an aerodynamic constriction because the flow of the combustion gases along the duct of the block occurs on an increasing quantity and increasing speed from the upstream end to the downstream end near where it achieves sonic velocity and a decrease of the static pressure along the length of the block.

The use of a single-duct nozzleless propulsion unit, that is, having a central duct is known particularly for the acceleration of ram-jet engines with an integral accelerator, such as those described in U.S.P. 3,535,881.

Procinsky, et al. at the AIAA/ASME 16th Joint Propulsion Conference (1980) acknowledged that nozzleless technology is relatively new, and they describe in their publication a propulsion unit that is intended for the acceleration of ram-jet engines with an integral accelerator. The unit is provided with a nozzle of large diameter which operates in the cruising stage and which is covered by the propellant during the major part of the acceleration phase.

This nozzle of large diameter has no influence on the flow of combustion gases streaming out the duct of the block during the acceleration stage.

One has to take into account the aspect ratio L/D of the chamber of the propulsion unit filled with the propellant block. By the aspect ratio of a cylinder is meant the ratio L/D of its length to its diameter. Procinsky on page 7, first column, third paragraph, states that higher aspect ratio, that is, L/D greater than 6, is needed for an efficient nozzleless booster operation.

Since the aspect ratio of the duct is linked to the aspect ratio of the block, it is difficult to use propellant block of aspect ratio below 6, and this because the combustion rate of composite propellant are too low to give a mass flow rate sufficiently high. Procinsky gives only one example with low aspect ratio (L/D=3.4) and shows that the performance is not sufficient in this case.

For example, the combustion chamber of a kerosene ram-jet engine of a diameter of 350 mm requires only a length of 800 mm. Its aspect ratio is therefore low, merely of the order of 2.3. However, it offers sufficient volume to accommodate in it the propellant necessary for accelerating the vehicle so driven up to the so-called transition speed, at which the ram-jet engine is to take over from the accelerator. There is therefore no need to lengthen it.

According to the present state of the art, conventional accelerations are not nozzleless, but they are equipped with an ejectable nozzle seated in the nozzle of the ram-jet engine, because it is of a cross-section much smaller than that of the latter, for reasons of the operating pressures, and jettisoned at the cutoff of the accelerator, thus possibly presenting a danger especially when the vehicle is launched from an aircraft.

Sutton, "Rocket Propulsion Elements," 5th Ed. John Wiley & Sons (1986), page 8, illustrates an integral rocket-ramjet in which the principles of the rocket and ramjet are combined with a common combustion chamber. The transition from the rocket to the ramjet requires enlarging the exhaust nozzle, usually by ejecting rocket nozzle parts, opening the ramjet air inlet-combustion chamber interface, and following these two events with the normal ramjet starting sequence.

Another type of ejectable nozzle in the transition from the acceleration stage to the cruising stage is described in German DE 3407901.

Procinsky, loc. cit., notes that the ejectable nozzle approach presented problems in the performance of a ram-jet, such as leakage between the ejectable nozzle and the ramjet nozzle, the need to add significant structural supports and the debris hazard to the launching aircraft.

An object of the present invention is to provide an acceleration propulsion unit which operates without a nozzle in spite of the fact that the aspect ratio L/D is between 2.5 and 6.

Another object is to provide a propulsion unit in which sonic velocity is achieved downstream of the ducts.

Still another object is to provide an acceleration propulsion unit with a solid propellant block which permits to eliminate the ejectable nozzles of prior devices.

Still another object is to provide a propulsion unit which occupies a limited space owing to L/D between 2.5 and 6.

The acceleration propulsion unit according to the invention is equipped with a propellant block having one axial duct and is secured to the body of the propulsion unit by means of a combustion inhibitor. The propellant block has an aspect ratio of between 2.5 and 6, and has at least six identical peripheral ducts. The upstream face of the propellant block possesses a fitting secured to the body of the propulsion unit, this fitting providing a free space between the upstream face of the propellant block and the bottom of the body of the propulsion unit, the axial duct and the peripheral ducts opening into this free space via orifices made in the fitting and terminating at the opposite end (downstream end) in a divergent part.

The acceleration propulsion unit according to the invention operates without a nozzle, even though it is equipped with a propellant block of an aspect ratio of between 2.5 and 6.

Each of the ducts taken individually has a sufficient aspect ratio to ensure that the velocity of the gases reaches sound velocity in a section near the downstream end of the duct, and downstream of this section possesses a divergent part making it possible to expand the gases with acceptable efficiency. These ducts open onto the rear face of the block, in such a way that the resultant of the thrust vectors is borne along the axis of the vehicle to be accelerated.

Because all the ducts open into the free space provided upstream of the block, this space performs the function of a pressure-balancing chamber, and the change of pressure as a function of time in each duct is such that there is substantial equality of the pressures at each moment. To minimize the combustion residues, that is, residues from the propellant which do not undergo combustion, the peripheral ducts are arranged on one or two concentric circles and number 6 or 12 respectively. According to a preferred embodiment of the invention, the block has seven ducts, namely one axial duct and six peripheral ducts.

According to a preferred embodiment, the six peripheral ducts are parallel to the axial duct.

Furthermore, the peripheral ducts of the charge are at a distance from the outer surface of the propellant block corresponding to half the thickness separating the ducts from one another.

The central duct can be of circular or hexagonal cross-section.

The peripheral ducts located on the concentric circle or circles can be of a cross-section suitable for the type of propellant used, to limit the interactions between the various ducts at the moment of combustion, and for the potential incidence of the combustion residues. The cross-section of these ducts can, therefore, be a circle, a regular hexagon, a pentagon or a trapezium, but the large base of the trapezium can be curved or straight. Advantageously, the peripheral ducts have a cross-section substantially in the form of an isosceles trapezium. The trapezoidal form is useful because it reduces the combustion residues to a minimum and maintains efficient combustion and an efficient gas flow for the longest possible time.

The pressure difference $\Delta p$ prevailing between the two end faces of the propellant block is increased as a result of the high aspect ratio of the ducts. The propellant block thus perforated is more fragile than a single-duct block and consequently more fragile than a front-combustion block.

It is well known to an average person skilled in the art to secure the propellant block laterally to the body of the propulsion unit by means of a combustion inhibitor. It has been found, however, that this fastening is insufficient for a multiply perforated propellant block.

The propellant block of the propulsion unit according to the invention has, on its upstream face, a fitting secured to the body of the propulsion unit, this fitting providing a free space between the upstream face of the propellant block and the bottom of the body of the propulsion unit, the axial duct and the peripheral ducts opening into this free space via orifices made in the fitting.

According to a preferred embodiment of the invention, the fitting consists of a perforated plate, the orifices of which are the same number as the ducts of the propellant block, are in line with the peripheral ducts and the axial duct, and the plate is fastened to the upstream face of the propellant block by means of the combustion inhibitor.

The free space thus provided between the fitting fastened to the upstream face of the propellant block and the bottom of the propulsion unit forms a chamber for balancing the internal pressure, which reduces the pressure differences likely to arise during combustion. This precaution is advantageous because, if the propellant thickness separating two ducts and becoming increasingly small in proportion as combustion proceeds were subjected to a pressure difference, at the end of combustion this difference would give rise to the premature rupture of the propellant not yet burnt, with a risk of ejection of propellant fragments. This would cause an irregularity at the end of combustion and considerable loss of efficiency would result. This pressure-balancing chamber located at the upstream end of the acceleration propellant can be arranged downstream of the gas generator of a ram-jet engine.

The upstream fitting of the propellant has orifices which allow the combustion gases and their pressure, to be distributed among the ducts by way of the balancing chamber. These orifices can have the exact initial form of the ducts in the propellant or a completely different form. For example, the ducts can be of trapezoidal cross-section and the orifices in the fitting can be cylindrical or troconical.

The usefulness of cylindrical or troconical orifices is that this fitting can be used again for the second propulsion phase, within the scope of a ram-jet engine arrangement, in order to distribute the jets of combustible gases; the fitting is then used as a diffuser/injector.

The fitting is fastened to the body of the propulsion unit and incorporates an inhibitor, particularly by the return of the inhibitor securing the propellant to the tube of the propulsion unit. The inhibitor serving for protecting the fitting can be arranged on either face of the latter, but is preferably arranged on the rear face of the fitting, that is to say between the propellant block and the fitting itself, to prevent it from being excessively heated.

According to another preferring embodiment, the propulsion unit according to the invention forms the acceleration stage of a ram-jet engine. In this case, the downstream end of the propellant block is located in the region of the nozzle of the ram-jet engine and preferably in the region of the divergent part of this nozzle, such a configuration making it possible to accommodate more propellant in the body of the propulsion unit.

Each duct terminates in a divergent part, in order to improve the expansion of the gases, and where the acceleration block of a ram-jet engine is involved this widened part is positioned in the region of the nozzle of the ram-jet engine.

The combustion of the propellant takes place in parallel layers, and at the end of combustion non-burned material, called combustion residues, remain on the periphery of the inner inhibitor fixed to the structure of the propulsion unit while the central residues are ejected.

According to a first embodiment, these residues can be partially eliminated by using a combustion-inhibiting material which penetrates into the outer cylindrical surface of the propellant block in at least two zones located in the region of these residues, thus forming longitudinal ribs affording the advantage of reducing the risks that combustion instabilities will occur during the functioning of the ram-jet engine.

According to another embodiment, these residues are eliminated completely and rapidly by using a twin-composition block, the propellant of higher combustion rate being arranged in the zones located in the region of the external combustion residues.

According to a preferred embodiment of the invention, the propellant used is a composite propellant with a hydroxytelechelic polybutadiene binder and contains up to 5% by mass of ferrocenic catalysts.

The invention is described below by way of example with references to the drawings of which:

FIG. 2 shows a cross-section AA' through the acceleration propulsion unit according to FIG. 1;

FIG. 3 shows the theoretical pressure curves existing in the peripheral ducts and in the central duct of the propellant block of the acceleration propulsion unit as a function of the combustion time;

FIG. 4 shows the pressure curve as a function of the combustion time;

FIG. 5 shows the thrust curve as a function of the combustion time;

Figure 1:
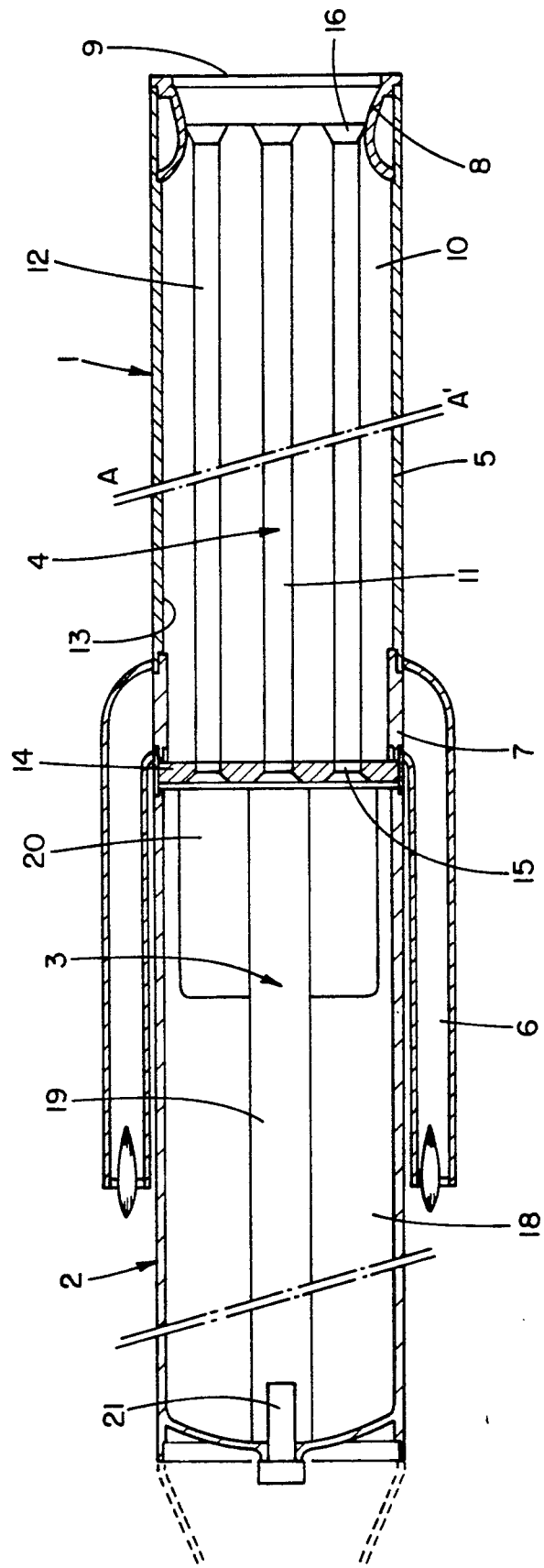
FIG. 1 shows a propulsion unit according to the invention used as an integral accelerator of a ram-jet engine.

Referring to FIG. 1, a ram-jet engine with an integral accelerator consists of an acceleration propulsion unit (1) according to the invention and of a gas generator (2).

The combustion chamber of the gas generator is called a primary chamber (3). The combustion chamber of the acceleration propulsion unit, initially occupied by a propellant block, is called the secondary chamber (4).

The body (5) of the acceleration propulsion unit (1) is equipped, at its upstream end, with air inflow orifices (6) closed by means of caps (7) during the acceleration phase and, at its downstream end, with a nozzle (8) of large cross-section, intended for expanding the combustion gas of the ram-jet engine and initially closed by means of a cap (9).

The secondary chamber of the ram-jet engine is equipped with an acceleration propellant block (10) with a PBHT binder, multiply perforated with a longitudinal central duct (11) and 6 longitudinal peripheral ducts (12). This block (10) has a diameter of 191 mm for a length of 500 mm, that is to say an aspect ratio of 2.61.

This multiply perforated propellant block (10) is secured laterally to the body of the propulsion unit (5) by means of a combustion inhibitor (13). The upstream face of this block has a plate (14) perforated with frustoconical orifices (15) in the same number as and in line with the peripheral ducts (12) and with central duct (11) of the propellant block (10), to which it is fastened by means of a combustion inhibitor.

The downstream face of the propellant block (10) is located in the region of the divergent part of the nozzle (8), and the peripheral ducts (12) and central duct (11) terminate in a divergent part (16).

The gas generator is equipped with a suboxygenated propellant block generating reduction gases (18), which is equipped with a central duct (19) and which is secured to the primary chamber (3).

The suboxygenated propellant block does not occupy the entire space of the primary combustion chamber: a free space (20) is provided between the perforated plate (14) and the downstream end of the block (18), to form a pressure-balancing chamber.

An igniter (21) is located at the upstream end of the central duct of the suboxygenated propellant block (18).

It should be noted that the igniter (21) could also have been placed in the region of the free space (20).

According to FIG. 2, the multiply perforated propellant block (10) is secured laterally to the body (5) of the acceleration propulsion unit (1) by means of a combustion-inhibiting material (13). This block is perforated with a hexagonal central duct (11) of a height of 42 mm and with 6 peripheral ducts (12) arranged on a circle concentric relative to the central duct (11).

The six peripheral ducts (12) have a cross-section substantially in the form of an isosceles trapezium, likewise of a height of 42 mm, and they are arranged in such a way that their flanks are parallel two by two.

The combustion-inhibiting material (13) penetrates into the outer cylindrical surface of the propellant block (10) in three zones located in the region of the combustion residues (22), thus having three longitudinal ribs (23) parallel to the ducts.

During the launching of the vehicle equipped with such a ram-jet engine with an integral accelerator, the combustion gases of the igniter (21) pass through the central duct (19) of the gas-generating block (18) and flow through the orifices in the plate (14) into the ducts of the multiply perforated block (10) of the accelerator which they ignite. The pressure in the entire volume not occupied by propellant (ducts of the accelerator block, balancing chamber and duct of the gas-generating block) rises quickly and causes the cap (9) to be ejected, thus allowing the ejection of the combustion gases of the accelerator and causing the acceleration of the vehicle.

Since the combustion gases of the igniter (21) pass through the central duct of the gas-generating block (18), they also initiate the pyrolysis of the latter. The pyrolysis gases produced during the combustion period of the accelerator are ejected together with the combustion gases of the latter and are lost in terms of the subsequent functioning of the ram-jet engine, but they contribute slightly to the acceleration of the vehicle.

The multiply perforated propellant block (10) burns within approximately 1.8 seconds, and the ejection of the combustion gases accelerates the vehicle up to a sufficient speed to allow the ram-jet engine to take over from the accelerator.

Combustion takes place in parallel layers. As can be seen in FIG. 3, the curve of pressure as a function of time is decreasing, and the pressure prevailing in the peripheral ducts (12) is substantially equal to that prevailing in the region of the central duct (11), thus reducing the risks of premature rupture of the block. Furthermore, the presence of the ribs (23) in the region of the combustion residues allows combustion to stop sharply.

Once the combustion of the multiply perforated propellant block (10) has ended, the pressure in the combustion chamber decreases, thus causing the ejection of the caps (7) via the secondary combustion chamber (4) and the massive inflow of air through the orifices (6).

The pyrolysis gases of the generator ignite spontaneously with the air under the pressure and temperature conditions of the latter. The mixture of air and of pyrolysis gases in combustion experiences a considerable increase in temperature and is ejected through the nozzle of large cross-section (8); this initiates functioning in the ram-jet engine mode of operation.

FIGS. 4 and 5, illustrating the bench-test launching curves for a multiply perforated accelerator charge, show that the ignition of the charge takes place after 20 milliseconds and that combustion lasts for 1.8 seconds. At this time, a pressure peak attributable to the ejection of the central residues is seen on the curves.

The shapes of the pressure and thrust curves are comparable to those of known single-duct nozzleless charges, namely a decreasing pressure curve and a slightly increasing thrust curve.

What is claimed is:

1. An acceleration propulsion unit (1) having a body (5), said body having a bottom, said propulsion unit consisting of a propellant block (10) secured laterally to said body by means of a combustion inhibitor and having an upstream face and a downstream end and having one axial duct (11), wherein said propellant block has an aspect ratio of between 2.5 and 6, said block having at least six identical peripheral ducts (12), said upstream face of said propellant block possessing a plate with orifices (15) fixed to said body, said plate providing a free space (20) between said upstream face of the propellant block and said bottom of said body, the axial duct and the peripheral ducts opening into said free space via said orifices made in said plate and diverging at the downstream end (16).

2. The propulsion unit according to claim 1 wherein the propellant block (10) has only six peripheral ducts (12).

3. The propulsion unit according to claim 2 wherein the six peripheral ducts (12) are parallel to the axial duct (11).

4. The propulsion unit according to claim 1 wherein the peripheral ducts (12) have a cross-section substantially in the form of an isosceles trapezium.

5. The propulsion unit according to claim 1 which forms the acceleration stage of a ram-jet engine with an integral accelerator.

6. The propulsion unit according to claim 5 wherein said ram jet engine has a nozzle (8) at its downstream end, said peripheral ducts of the block form a divergent part in the region of said nozzle.

7. The propulsion unit according to claim 1 which has a gas generator at its upstream end, combustion gases flow through said perforated plate and at the downstream end said gases are ejected rearwardly without requiring a nozzle.

8. The propulsion unit according to claim 1 which possesses an igniter located at least partially in the region of said free space (20).

9. The propulsion unit according to claim 7 wherein said orifices (15) in said plate (14) form the orifices for the injection of the reduction gases of the upstream charge of the propulsion unit.

10. The propulsion unit according to claim 1 wherein the propellant block (10) is of bicomposition, the propellant of higher combustion rate being arranged in the region of the combustion residues (22) at the periphery of the combustion inhibitor.

11. The propulsion unit according to claim 1 wherein said propellant block is multiply perforated and the propellant block (10) is a composite propellant with a hydroxytelechelic polybutadiene binder and contains up to 5% by mass of ferrocenic catalysts.

12. A propulsion unit according to claim 11 wherein said perforated plate (14) is fastened to said upstream face of the propellant block by means of said combustion inhibitor.

13. The propulsion unit according to claim 10 wherein said propellant block has an outer cylindrical surface, the combustion inhibitor penetrates into said outer cylindrical surface in at least two zones located in the region of the combustion residues (22) located at the periphery of said combustion inhibitor.

* * * * *